(12) United States Patent
Tang et al.

(10) Patent No.: US 9,759,915 B2
(45) Date of Patent: Sep. 12, 2017

(54) SHORT-DISTANCE OPTICAL AMPLIFICATION MODULE AND NEAR-EYE DISPLAY OPTICAL MODULE USING THE SAME

(71) Applicant: Shenzhen Dlodlo Technologies Co., Ltd., Shenzhen (CN)

(72) Inventors: Weiping Tang, Shenzhen (CN); Gang Li, Shenzhen (CN); Fengxue Zhang, Shenzhen (CN); Xu Xiong, Shenzhen (CN)

(73) Assignee: SHENZHEN DLODLO TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/949,262

(22) Filed: Nov. 23, 2015

(65) Prior Publication Data

US 2017/0017078 A1    Jan. 19, 2017

Related U.S. Application Data

(63) Continuation of application No. 14/883,144, filed on Oct. 14, 2015, now Pat. No. 9,690,097.

(30) Foreign Application Priority Data

Jul. 13, 2015   (CN) .......................... 2015 1 0409476

(51) Int. Cl.
*G02B 5/30*    (2006.01)
*G02B 27/01*   (2006.01)
(Continued)

(52) U.S. Cl.
CPC ......... *G02B 27/0101* (2013.01); *G02B 5/003* (2013.01); *G02B 5/3083* (2013.01);
(Continued)

(58) Field of Classification Search
CPC  G02B 5/3025; G02B 5/3083; G02B 27/0172; G02B 2027/0116; G02B 5/003; G02B 27/0101; G02B 27/283
(Continued)

(56) References Cited

U.S. PATENT DOCUMENTS 5,715,023 A * 2/1998 Hoppe ................. G02B 5/3016
                                                    349/11
5,966,242 A * 10/1999 Yamanaka ......... G02B 27/0172
                                                    359/618

(Continued)

FOREIGN PATENT DOCUMENTS

CN    104076515 A    10/2014
CN    204086682 U     1/2015
(Continued)

OTHER PUBLICATIONS

European Search Report, Application No. 15193205.0, dated Jan. 22, 2016 (4 pages).
(Continued)

*Primary Examiner* — Ricky D Shafer
(74) *Attorney, Agent, or Firm* — K&L Gates LLP

(57) ABSTRACT

A short-distance optical amplification module and a near-eye display optical module using the same in the present invention relates to an optical amplification module applicable for short distance and an optical module using the same for near-eye display. The purpose of the present invention is to provide an optical amplification module for large-multiple amplification within a short distance (less than 5 cm) and a near-eye display optical module using the same to achieve super large field of view within a short distance (less than 3 cm). The short-distance optical amplification module in the present invention comprises a first 45 degree phase delay sheet (2), a partial-transmission and partial-reflection curved lens (4), a second 45 degree phase delay sheet (5) and a
(Continued)

reflective polarizing sheet (6) which are sequentially arranged. The near-eye display optical module in the present invention comprises a display screen (1) disposed on the side of the first 45 degree phase delay sheet (2) away from the partial-transmission and partial-reflection curved lens (4).

3 Claims, 2 Drawing Sheets

(51) Int. Cl.
    *G02B 27/28*     (2006.01)
    *G02B 5/00*     (2006.01)

(52) U.S. Cl.
    CPC ....... *G02B 27/0172* (2013.01); *G02B 27/283* (2013.01); *G02B 27/286* (2013.01); *G02B 2027/013* (2013.01); *G02B 2027/0116* (2013.01); *G02B 2027/0118* (2013.01); *G02B 2027/0123* (2013.01)

(58) Field of Classification Search
    USPC .................. 359/485.01, 489.07, 631, 634
    See application file for complete search history.

(56) References Cited

U.S. PATENT DOCUMENTS

| | | | | |
|---|---|---|---|---|
| 6,075,651 | A * | 6/2000 | Hoppe | G02B 27/0172 359/15 |
| 6,094,242 | A | 7/2000 | Yamanaka | |
| 6,262,841 | B1 | 7/2001 | Dike | |
| 6,421,183 | B1 | 7/2002 | Ophey | |
| 6,710,928 | B2 * | 3/2004 | Roest | G02B 27/0172 359/631 |
| 6,853,491 | B1 | 2/2005 | Ruhle et al. | |
| 8,305,690 | B2 * | 11/2012 | Ruhle | G02B 5/3016 349/11 |
| 2004/0014504 | A1 | 1/2004 | Coates et al. | |
| 2005/0286135 | A1 | 12/2005 | Weissman et al. | |
| 2006/0232862 | A1 | 10/2006 | Steven et al. | |
| 2016/0077351 | A1 * | 3/2016 | Iwane | G03B 35/24 349/15 |

FOREIGN PATENT DOCUMENTS

| | | |
|---|---|---|
| CN | 204360019 U | 5/2015 |
| CN | 201510409476.5 | 7/2015 |
| JP | H 08223509 A | 8/1996 |
| JP | H 2011-142783 | 5/1999 |
| JP | 2000-275566 | 10/2000 |
| JP | 2002244076 A | 8/2002 |
| JP | 2005-148655 | 5/2005 |
| KR | 20080044040 A | 5/2008 |
| KR | 20090053316 A | 5/2009 |
| KR | 20130116548 A | 10/2013 |
| KR | 20140066258 A | 5/2014 |
| WO | WO 01/02893 A1 | 1/2001 |
| WO | WO 01/75508 A1 | 10/2001 |
| WO | WO 2014/116615 A1 | 7/2014 |
| WO | WO 2014/129630 A1 | 8/2014 |

OTHER PUBLICATIONS

Australian Examination Report, Application No. 2015268733, dated Jan. 22, 2016 (5 pages).
Korean Search Report, Application No. KR 10-2015-0187465, dated Jan. 4, 2016 (7 pages).
Korean Notification of Grounds for Rejection (Office Action), Application No. KR 10-2015-0187465, dated May 4, 2016 (5 pages).
Japanese Notification of Grounds for Rejection (Office Action), Application No. JP 2016-028050, dated Apr. 19, 2016 (5 pages).
U.S. Appl. No. 14/883,144, Non-Final Office Action, dated Oct. 6, 2016 (7 pages).
U.S. Appl. No. 14/883,144, Response to Non-Final Office Action dated Dec. 27, 2016 (6 pages).

* cited by examiner

SHORT-DISTANCE OPTICAL AMPLIFICATION MODULE AND NEAR-EYE DISPLAY OPTICAL MODULE USING THE SAME

CROSS REFERENCE TO RELATED APPLICATIONS

This application is a continuation of U.S. patent application Ser. No. 14/883,144, entitled SHORT-DISTANCE OPTICAL AMPLIFICATION MODULE AND NEAR-EYE DISPLAY OPTICAL MODULE USING THE SAME, filed Oct. 14, 2015, which application claims priority under 35 U.S.C. §119(a) to Chinese Patent Application Number 201510409476.5, filed on Jul. 13, 2015, the disclosures of which are incorporated herein by reference in their entirety.

FIELD OF THE INVENTION

The present invention relates to an optical instrument, particularly an optical amplification module for short distance application and an optical module for near-eye display using the same.

BACKGROUND OF THE INVENTION

In prior art, there is neither any optical amplification module applicable for large-multiple amplification within a short distance (less than 5 cm), nor any display optical module applicable for near-eye display with over 100 degree super large field of view (FOV) within a short distance (less than 3 cm).

SUMMARY OF THE INVENTION

Therefore, the technical problem to be solved by the present invention is to provide an optical amplification module for large-multiple amplification within a short distance (less than 5 cm) and a near-eye display optical module using the same to achieve super large field of view within a short distance (less than 3 cm).

A short-distance optical amplification module in the present invention comprises a first 45 degree phase delay sheet, a partial-transmission and partial-reflection curved lens, a second 45 degree phase delay sheet and a reflective polarizing sheet sequentially arranged.

A near-eye display optical module using the short-distance optical amplification module in the present invention comprises a display screen disposed on the side of the first 45 degree phase delay sheet away from the partial-transmission and partial-reflection curved lens, wherein the display screen and the partial-transmission and partial-reflection curved lens are respectively disposed on both sides of the first 45 degree phase delay sheet.

The near-eye display optical module in the present invention further comprises an optical device with no effect on a light phase delay, which is disposed between any adjacent two of the display screen, the first 45 degree phase delay sheet, the partial-transmission and partial-reflection curved lens, the second 45 degree phase delay sheet and the reflective polarizing sheet.

In the near-eye display optical module of the present invention, the optical device with no effect on the light phase delay is an optical module for correcting hue variation.

In the near-eye display optical module of the present invention, the display screen, the first 45 degree phase delay sheet, the partial-transmission and partial-reflection curved lens, the second 45 degree phase delay sheet and the reflective polarizing sheet are disposed coaxially.

In the near-eye display optical module of the present invention, the axial side thereof is coated with light absorption materials.

In the near-eye display optical module of the present invention, the partial-transmission and partial-reflection curved lens is a curved lens with 50% transmission and 50% reflection.

The short-distance optical amplification module in the present invention distinguishes from the prior art by that: a light reaches the reflective polarizing sheet through the first 45 degree phase delay sheet, the partial-transmission and partial-reflection curved lens and the second 45 degree phase delay sheet, generates a first reflection at the reflective polarizing sheet, then reaches the partial-transmission and partial-reflection curved lens through the second 45 degree phase delay sheet, generates a second reflection at the partial-transmission and partial-reflection curved lens, and reaches human eyes after transmitting through the second 45 degree phase delay sheet and the reflective polarizing sheet again sequentially. In this way, a light is allowed to be reflected twice within the optical amplification module by including the reflective polarizing sheet and the partial-transmission and partial-reflection curved lens, and a large-multiple amplification is achieved by the second reflection. Similarly, the near-eye display optical module using the short-distance optical amplification module of the present invention also realizes a large-angle adjustment for light and enlarges field of view by allowing light to generate two reflections within the optical amplification module and using the second refection.

In the near-eye display optical module of the present invention, the display screen, the first 45 degree phase delay sheet, the partial-transmission and partial-reflection curved lens, the second 45 degree phase delay sheet and the reflective polarizing sheet are disposed coaxially, thereby facilitating human eyes to view images at the axial center of the optical module.

The axial side of the near-eye display optical module in the present invention is coated with light absorption materials, such that the light finally not reaching human eyes through the reflective polarizing sheet can be absorbed, thereby preventing the light from affecting the display result.

The present invention would be further explained below in combination with figures.

DETAILED DESCRIPTION OF THE EMBODIMENTS

In the present invention, a 45 degree phase delay sheet, a reflective polarizing sheet and a partial-transmission and partial-reflection curved lens all pertain to prior art. The most common 45 degree phase delay sheet is a ¼ wavelength plate, wherein, a 45 degree phase delay can be increased each time a light passes through the 45 degree phase delay sheet, i.e., a orthogonal polarized light turns into a polarized light with an increasement of 45 degree phase delay by a first transmission, turns into a polarized light with an increasement of 90 degree phase delay by a second transmission, turns into a polarized light with an increasement of 135 degree phase delay by a third transmission, and turns into a polarized light with an increasement of 180 degree phase delay by a fourth transmission, which becomes a orthogonal polarized light again. Besides, the reflective polarizing sheet can allow a direct transmission of a orthogonal polarized light and a total reflection of a polarized light with 90 degree phase delay. Further, the partial-transmission and partial-reflection curved lens can allow a part of light to be reflected and the rest part of light to be transmitted.

Examples of a short-distance optical amplification module in the present invention will be described.

Figure 1:
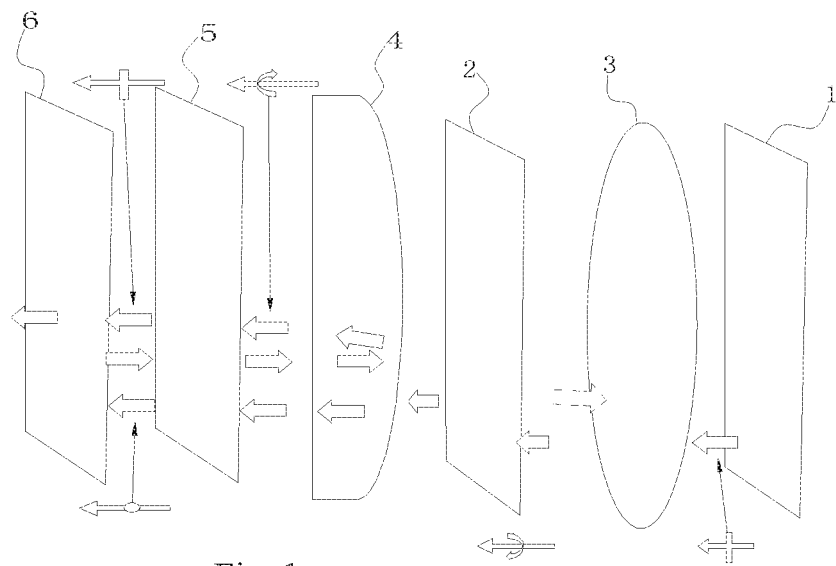
FIG. 1 is a schematic diagram of a short-distance optical amplification module in the present invention.

As shown in FIG. 1, the short-distance optical amplification module in the present invention comprises a first 45 degree phase delay sheet 2, a partial-transmission and partial-reflection curved lens 4, a second 45 degree phase delay sheet 5 and a reflective polarizing sheet 6, which are sequentially arranged.

An operational principle of the short-distance optical amplification module in the present invention is explained below.

A orthogonal polarized light turns into a polarized light with 45 degree phase delay through the first 45 degree phase delay sheet 2, and then the light with power of a certain proportion is firstly transmitted and amplified through the partial-transmission and partial-reflection curved lens 4, wherein the amplification is a small-multiple amplification. The amplified light passes through the second 45 degree phase delay sheet 5 and turns into a polarized light with 90 degree phase delay, and then has a total reflection on the reflective polarizing sheet 6. The reflected light passes through the second phase delay sheet 5 again and turns into a polarized light with 135 degree phase delay, and then the light with power of a certain proportion is reflected and amplified secondly through the partial-transmission and partial-reflection curved lens 4, wherein the amplification is a large-multiple amplification. The light amplified with large multiple is adjusted to a orthogonal polarized light through the second 45 degree phase delay sheet 5 again, and finally the orthogonal polarized light passes through the reflective polarizing sheet 6, thereby realizing a large-multiple amplification for light within a short distance (less than 5 cm).

Examples of a near-eye display optical module using the above short-distance optical amplification module in the present invention is described below.

Example 1

Figure 2:
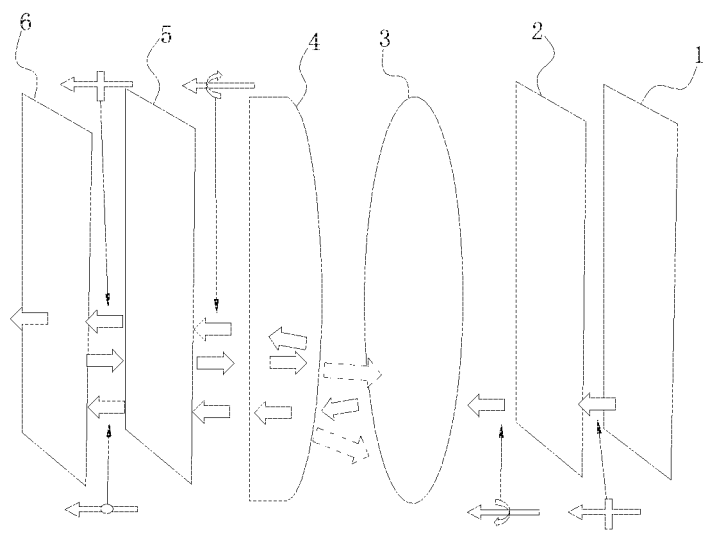
FIG. 2 is a schematic diagram of Example 1 of a near-eye display optical module in the present invention.

As shown in FIG. 2, a near-eye display optical module in the present invention comprises a display screen 1 disposed on the side of the first 45 degree phase delay sheet 2 away from the partial-transmission and partial-reflection curved lens 4, wherein the display screen 1 and the partial-transmission and partial-reflection curved lens 4 are respectively disposed on both sides of the first 45 degree phase delay sheet 2, such that a display effect with a small entire volume and a very large visual field is achieved.

Preferably, the display screen 1 is selected to be a micro high definition display screen, which can further achieve a display effect of large visual field and high definition on the condition of small volume. Preferably, the partial-transmission and partial-reflection curved lens 4 is a curved lens with 50% transmission and 50% reflection.

As required, an optical device with no effect on light phase delay may be provided between any adjacent two of the display screen 1, the first 45 degree phase delay sheet 2, the partial-transmission and partial-reflection curved lens 4, the second 45 degree phase delay sheet 5 and the reflective polarizing sheet 6. For instance, an optical module 3 for correcting hue variation may be provided between the first 45 degree phase delay sheet 2 and the partial-transmission and partial-reflection curved lens 4.

To allow human eyes to view images at the axial center of the reflective polarizing sheet 6, the display screen 1, the first 45 degree phase delay sheet 2, the partial-transmission and partial-reflection curved lens 4, the second 45 degree phase delay sheet 5 and the reflective polarizing sheet 6 are disposed coaxially.

The axial side of the near-eye display optical module in the present invention is coated with light absorption materials, such that the light finally not reaching human eyes through the reflective polarizing sheet 6 can be absorbed, so as to prevent the light from affecting the final display result.

The operational principle of the near-eye display optical module in the present invention is explained below.

A orthogonal polarized light passes through the first 45 degree phase delay sheet 2 through the display screen and turns into a polarized light with 45 degree phase delay, and then the light with power of a certain proportion is firstly transmitted and amplified through the partial-transmission and partial-reflection curved lens 4, wherein the amplification is a small-multiple amplification. The amplified light passes through the second 45 degree phase delay sheet 5 and turns into a polarized light with 90 degree phase delay, and then has a total reflection on the reflective polarizing sheet 6. The reflected light passes through the second phase delay sheet 5 again and turns into a polarized light with 135 degree phase delay, and then the light with power of a certain proportion is reflected and amplified secondly through the partial-transmission and partial-reflection curved lens 4, wherein the amplification is a large-multiple amplification. The light amplified with large multiple is adjusted to a orthogonal polarized light through the second 45 degree phase delay sheet 5 again, and finally the orthogonal polarized light passes through the reflective polarizing sheet 6, and is displayed to human eyes, thereby realizing a super large field of view within a short distance (less than 3 cm). The above orthogonal polarized light is a light which can be directly viewed by human eyes.

The present invention realizes a very large amplification multiple within a smaller overall optical channel by using a large-angle (relative to small angle variation of transmission) adjustment characteristics of optical module with a reflection function, thereby realizing an effect of viewing with a large field of view on micro screen. Taking into account a relatively low sensibility to whole luminance loss for near-eye optics, a method of losing partial power through partial transmission and partial reflection is applied in the entire optical design of the present invention, which will not incur obvious effect on the final display effect. To sum up, the present invention is directed to a near-eye display optical module achieving high amplification multiple, smaller entire thickness and little phase difference.

Example 2

Figure 3:
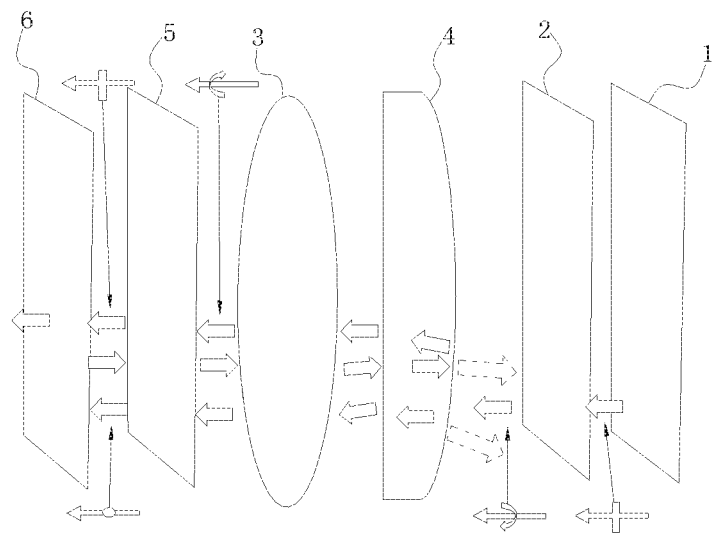
FIG. 3 is a schematic diagram of Example 2 of a near-eye display optical module in the present invention.

As shown in FIG. 3, Example 2 is different from Example 1 in the disposing position of the optical device with no effect on light phase delay. For instance, an optical module 3 for correcting hue variation can be disposed between the partial-transmission and partial-reflection curved lens 4 and the second 45 degree phase delay sheet 5.

Example 3

Figure 4:
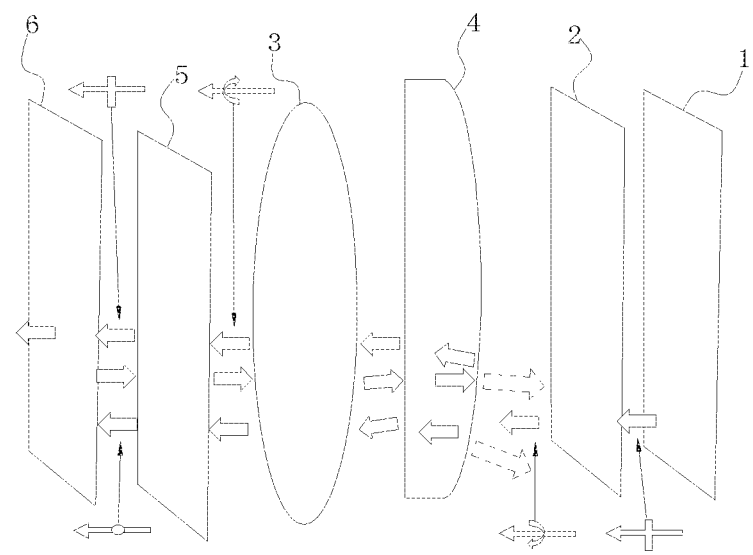
FIG. 4 is a schematic diagram of Example 3 of a near-eye display optical module in the present invention.

As shown in FIG. 4, Example 3 is different from Example 2 in that the display screen 1, the first 45 degree phase delay sheet 2, the partial-transmission and partial-reflection curved lens 4, the second 45 degree phase delay sheet 5 and the reflective polarizing sheet 6 are disposed non-coaxially.

The above Examples merely describe the preferable embodiments of the present invention, rather than make any limitation to the scope of the present invention. Further, various changes and modifications made to the technical schemes of the present invention by one of ordinary skilled in the art without departing from the spirit of the present invention, shall all fall into the protection scope as defined in the appended claims of the present invention.

What is claimed is:

1. A near-eye display optical module, comprising a display screen (1), a first 45 degree phase delay sheet (2), a partial-transmission and partial-reflection curved lens (4), a second 45 degree phase delay sheet (5) and a reflective polarizing sheet (6), which are sequentially arranged, wherein an optical device with no effect on a light phase delay is disposed between the display screen (1) and the first 45 degree phase delay sheet (2), the partial-transmission and partial-reflection curved lens (4) is a plano-convex lens, and the optical device with no effect on the light phase delay is an optical module (3) for correcting hue variation.

2. The near-eye display optical module according to claim 1, wherein the display screen (1), the first 45 degree phase delay sheet (2), the partial-transmission and partial-reflection curved lens (4), the second 45 degree phase delay sheet (5) and the reflective polarizing sheet (6) are disposed coaxially.

3. The near-eye display optical module according to claim 2, wherein an axial side of the near-eye display optical module is coated with light absorption materials.

\* \* \* \* \*